United States Patent
Wan et al.

(10) Patent No.: US 7,697,948 B2
(45) Date of Patent: Apr. 13, 2010

(54) RESOURCE ALLOCATION IN COMMUNICATION NETWORKS

(75) Inventors: Lei Wan, Beijing (CN); Magnus Almgren, Sollentuna (SE); Shiau-He Shawn Tsai, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 431 days.

(21) Appl. No.: 11/577,540

(22) PCT Filed: Oct. 29, 2004

(86) PCT No.: PCT/SE2004/001575

§ 371 (c)(1),
(2), (4) Date: Apr. 19, 2007

(87) PCT Pub. No.: WO2006/046894

PCT Pub. Date: May 4, 2006

(65) Prior Publication Data

US 2007/0298822 A1    Dec. 27, 2007

(51) Int. Cl.
*H04B 7/00* (2006.01)
*H04Q 7/20* (2006.01)

(52) U.S. Cl. ............... 455/509; 455/517; 455/452.2; 455/67.13

(58) Field of Classification Search .......... 455/509, 455/452.1, 450, 452.2, 512, 517, 437, 412.2, 455/511, 63.1, 67.13, 67.11, 115.1, 115.3; 370/328, 335
See application file for complete search history.

(56) References Cited

U.S. PATENT DOCUMENTS 6,091,933 A * 7/2000 Sherman et al. ............ 455/13.1
7,079,848 B2 * 7/2006 Das et al. ................. 455/452.2
2008/0123542 A1 * 5/2008 Karlsson .................... 370/252

OTHER PUBLICATIONS

Frenger, P., Parkvall, S., Dahlman, E., "Performance Comparison of HARQ with Chase Combining and Incremental Redundancy for HSDPA", VTC 2001 Fall. IEEE VTS 54th, vol. 3, Oct. 7-11, 2001, pp. 1829-1833 vol. 3.
Dottling, M., Michel, J., Raaf, B., "Hybrid ARQ and Adaptive Modulation and Coding Schemes for High Speed Downlink Packet Access", Personal, Indoor and Mobile Radio Communications, 2002. The 13th IEEE International Symposium, vol. 3, Sep. 15-18, 2002, pp. 1073-1077, vol. 3.
John G. Proakis, "Digital Communications", McGraw-Hill Inc., ver. 3, p. 380 (Eq. 7-1-15).
Aradhana Narula, et al. "Efficient Use of Side Information in Multiple-Antenna Data transmission Over Fading Channels" IEEE Journal, Selected Areas in Communications, vol. 16, issue 8 Oct. 1998, pp. 1423-1436.

* cited by examiner

*Primary Examiner*—John Lee
(74) *Attorney, Agent, or Firm*—Roger S. Burleigh (57) ABSTRACT

A method of adapting resource allocation parameters to reach one or more quality targets with improved accuracy is proposed. New information measurements based on the so-called mutual information, preferably at block-level, are introduced. The MI-based information measurements of a previous transmission, the channel prediction of a subsequent transmission and one or more quality requirements, are used to determine the amount and type of resources, e.g. time, frequency and power resources, that are to be used for the subsequent transmission. The resource allocation can for example comprise power allocation and/or link adaptation and the invention enables an advantageous implementation with cooperative link-adaptation and power allocation. The proposed method is useful in connection with ARQ/HARQ retransmissions.

38 Claims, 6 Drawing Sheets

RESOURCE ALLOCATION IN COMMUNICATION NETWORKS

TECHNICAL FIELD

The present invention generally relates to telecommunication networks and in particular to resource allocation in such networks.

BACKGROUND

A general concern in telecommunication networks of today is how to allocate resources, such as transmit power and frequency, in an appropriate manner. The resources are limited and as the number of links and subscribers continuously increases, the network complexity is increased, whereby more sophisticated solutions are needed. Typically, efficient resource utilization and reliable transmissions are aimed at.

Automatic Repeat reQuest (ARQ) and Hybrid Automatic Repeat reQuest (HARQ) are widely used in data transmission to keep the transmission quality. ARQ retransmits the data blocks when a NACK feedback is received to indicate an incorrect receiving. The receiver discards the failed blocks immediately. The principle of HARQ is instead to buffer the data blocks that were not received correctly and combine the buffered data with retransmissions. The soft combining procedure normally depends on which type of HARQ combining scheme that is used, e.g. Chase combining (HARQ-CC) or Incremental Redundancy (HARQ-IR) [1].

Existing solutions like the above-mentioned ARQ/HARQ mechanisms are associated with a number of problems. ARQ/HARQ tries to keep the transmission quality, but cannot guarantee successful transmissions. Even with the maximum number of retransmissions, the block may not be received correctly in a bad transmission environment. A higher limit of the maximum retransmission times will increase the transmission reliability, but will require larger buffer size and cause longer transmission delay.

To reach higher transmission efficiency, some studies have been done on HARQ/Adaptive Modulation and Coding (AMC) scheduling based on channel prediction [2]. The main concern of HARQ/AMC is to adapt or counteract the uncertainty of wireless channel variation and the most common measure is using the required average signal-to-noise ration as the metric. HARQ/AMC requires exhaustive simulation of all possible channel variations, which is a formidable task.

Accordingly, the handling of resources during transmission in conventional telecommunication systems is far from satisfactory and there is a considerable need for an improved resource allocation mechanism.

SUMMARY

A general object of the present invention is to achieve improved handling of resources in wireless telecommunication networks. A specific object is to ensure transmission reliability and transmission efficiency. Another object is to reduce the resource waste in the networks. Still another object is to provide an improved resource allocation mechanism suitable for use with ARQ/HARQ.

Briefly, the present invention proposes a new method of adapting resource allocation parameters to reach one or more quality targets with improved accuracy. New quality indicators based on the so-called mutual information (MI), preferably at block-level, are introduced in the resource allocation. The MI-based quality indicators of a previous transmission, the channel prediction of a subsequent transmission and optionally one or more additional quality requirements, are used to determine the amount and type of resources, e.g. time, frequency and power resources, that are to be used for the subsequent transmission. The resource allocation preferably comprises power allocation and/or link adaptation. The latter can for example include adaptive selection of modulation-mode, coding rate, and/or source data rate based on the channel conditions. It also includes channel allocation among a plurality of users. In particular, the invention enables an advantageous implementation where link-adaptation and power allocation are performed simultaneously based on the same measurement. The proposed method is very useful in connection with ARQ/HARQ retransmissions.

According to other aspects of the invention a communication unit and a communication system with means for resource allocation are provided.

BRIEF DESCRIPTION OF THE DRAWINGS

The invention, together with further objects and advantages thereof, is best understood by reference to the following description and the accompanying drawings, in which.

DETAILED DESCRIPTION

A list of abbreviations follows at the end of this section.

The present invention involves defining new information measurements and parameters based on which resource allocation (such as power allocation or link adaptation) to communication links in telecommunication networks is performed. Before the invention and example embodiments are described in detail, some underlying concepts and definitions will be explained in order to understand the principles thereof.

New Link-to-System Interface and Information Parameters

The present invention is based on the recognition of a new, improved link-to-system (L2S) interface, also referred to as a quality model, which gives practically optimal resource allocation rules/requirements (with or without ARQ/HARQ) provided that good channel estimations/predictions and measurements can be obtained.

Figure 1:
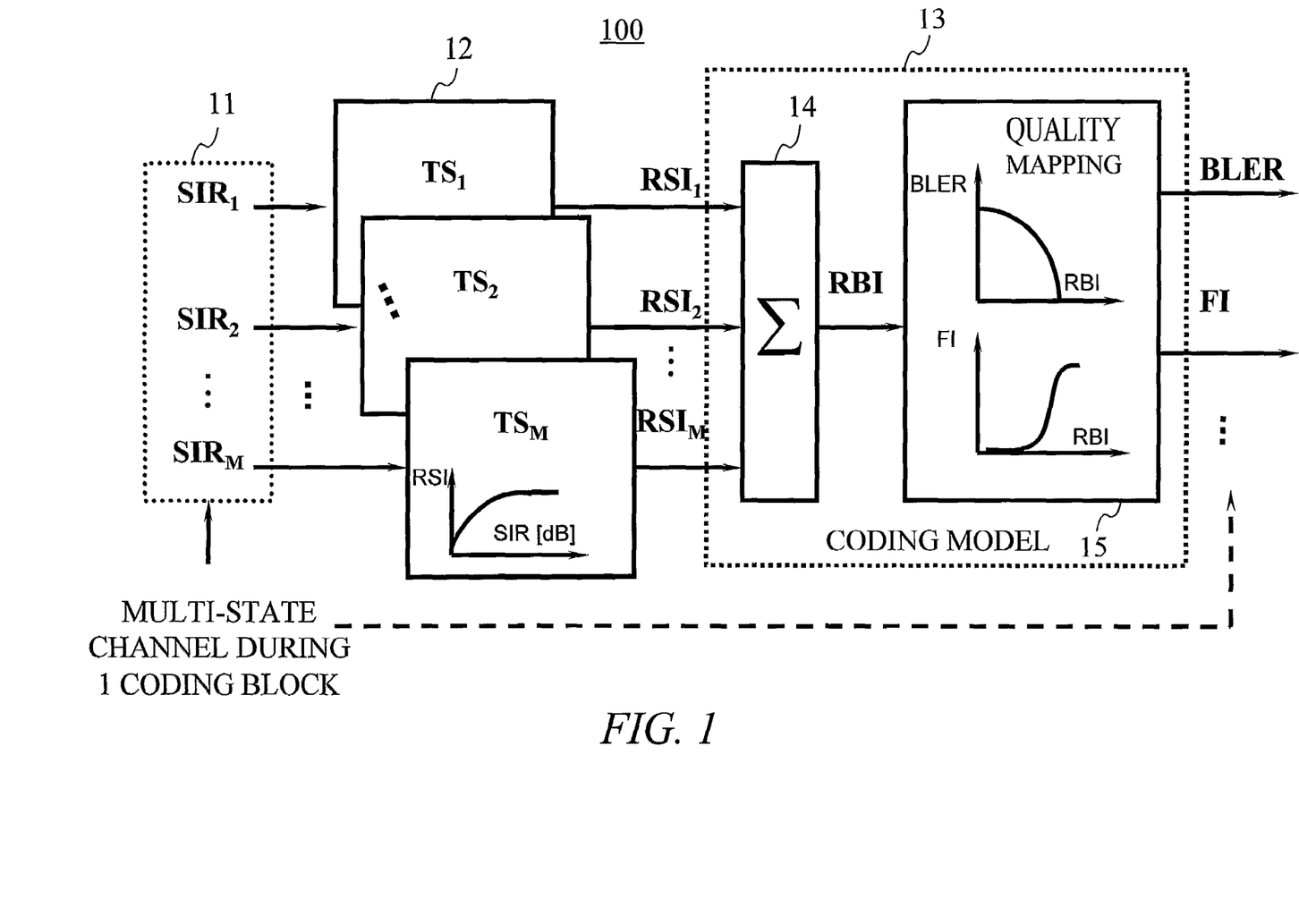
FIG. 1 is a schematic view of a quality model for quality indicator calculation in accordance with an example embodiment of the present invention.

FIG. 1 is a schematic block diagram illustrating an example embodiment of such a quality model in accordance with the invention. The quality model 100 describes the mapping relationship between link information measurements 11 (SIR in FIG. 1) and the final quality indicators or estimations (BLER and FI in FIG. 1). It comprises a modulation model 12 and a coding model 13, respectively. As will be further described below, a very advantageous feature of the proposed quality model 100 is that it presents a linear interface between the modulation model 12 and the coding model 13.

The quality of service requirement can be expressed by different quality indicators: BLER (block error rate), throughput, delay, as well as through one or more new indicators defined in accordance with the invention. These indicators can be obtained by statistics or based on link information measurements, such as SIR and rawBER, and play an important role in the resource allocation procedure of the invention. The new quality indicators will be derived in the section "Block-level mutual information" below but first the mutual information concept, on which the indicators are based, will be explained at symbol-level.

Symbol-Level Mutual Information

Seen from the decoder, the information from the source is carried by the soft outputs of the demodulator. A classical information value from information theory is the so-called mutual information (MI) between channel input and output, i.e. between encoder-output bit and decoder-input soft bit. The channel coding theorem states that an ideal codec (i.e. coder/decoder system) is capable of transmitting reliably at a coding rate equal to the mutual information of the channel [3]. The information measure based on the channel capacity can be expressed as the modulated symbol-level mutual information (SI) value. With $\gamma_j$ representing the signal-to-interference ratio (SIR) at time j, i.e.

$$\gamma_j = (E_{s/N0})_j, \quad (1)$$

SI is denoted $I(\gamma_j)$ and defined as:

$$I(\gamma_j) = E_{XY}\left\{\log_2 \frac{P(Y|X,\gamma_j)}{\sum_X P(X)P(Y|X,\gamma_j)}\right\} =$$

$$= E_X\left\{\int_{Y_R=-\infty}^{+\infty}\int_{Y_I=-\infty}^{+\infty} P(Y|X,\gamma_j) \cdot \log_2 \frac{P(Y|X,\gamma_j)}{\sum_X P(X)P(Y|X,\gamma_j)} dY_I dY_R\right\}, \quad (2)$$

where the modulated symbol X belongs to a certain modulation constellation, and the received symbol $Y=(Y_R+i*Y_I)\in C$, where C is the set of complex numbers [4]. In Equation (2), P(X) is the a-priori probability of X. $P(Y|X,\gamma_j)$ is the probability density function of Y conditioned on transmit symbol X and parameterized by channel state $\gamma_j$.

There are also approximations of the symbol information that can sometimes be used instead of Equation (2). For example, based on the Union Chernoff bound for coded transmission, the exponential effective SIR mapping (EESM) information expression for a M-symbol modulation:

$$I_{EESM}(\gamma_i) = (1-e^{-\gamma_i/\gamma_m}) \cdot \log_2 M \quad (3)$$

where $\gamma_m$ is the modulation adjusting factor for a given constellation.

Other approximate mutual information expressions can for instance be based on the BPSK cutoff rate:

$$I_{R0}(\gamma_i) = (1-\log_2(1+e^{-\gamma_i/2})) \cdot \log_2 M \quad (4)$$

or on the unified Shannon information theory, i.e. the AWGN capacity with real Gaussian inputs:

$$I_{Gauss}(\gamma_i) = \frac{1}{2}\log_2(1+\gamma_i) \quad (5)$$

There can also be still other approximate expressions, such as $$I_\alpha(\gamma_i) = (1-e^{-\gamma_i/\alpha})^\beta \cdot \log_2 M \quad (6)$$

where $\{\alpha, \beta\}$ is the modulation compensation exponent for a given constellation. With good training, (6) gives a very good match.

Block-Level Mutual Information

The behavior of a certain codec can be expressed as the mutual information per coding block.

For a (N, K) coding block, where K denotes the number of information bits and N denotes the number of coded bits within one coding block, which corresponds to J modulated symbols, the channel capacity is the cumulation of the SI:s within the block. Assuming that the received coding block experiences multiple channel states $\{\gamma_1, \gamma_2, \ldots, \gamma_J\}$ the mutual information is, in accordance with the present invention, further defined at different levels as the following quality indicators:

Received coded block information (RBI):

$$RBI(\{\gamma_j, j=1\sim J\}) = \sum_{j=1}^{J} I(\gamma_j) \quad (7)$$

For an M-order modulation, $I(\gamma_j) \leq \log_2 M = N/J$, and therefore $RBI(\gamma_j) \leq N$.

$$RBI = \sum_{m=1}^{M} RSI_m \text{ and } RSI = \sum_{s=1}^{S} SI_s,$$

where RSI denotes received slot information, SI is the symbol information, i.e. I, and S is the number of symbols in one slot. RBI is the total received encoded-bits (rawbit) information before decoding.

Received coded block information rate (RBIR), i.e. normalized RBI:

$$RBIR(\{\gamma_j, 1 \propto J\}) = RBI(\{\gamma_j\})/N \leq 1 \quad (8)$$

Block error rate (BLER) i.e. the ratio of the number of the error blocks over the total number of the transmitted blocks.

Frame information (FI):

$$FI(\{\gamma_j, j=1 \propto J\}) = (1-BLER)*K \quad (9)$$

FI is the received decoded bit information within one coding block and can be interpreted as the quantized throughput, i.e. the number of correctly received bits per coding block.

Block success rate (BSR), i.e. normalized FI:

$$BSR(\{\gamma_j, 1 \propto J\}) = 1 - BLER \quad (10)$$

Throughput (TP)

$$TP(\{\gamma_j, 1 \propto J\}) = BSR(\{\gamma_j\}) * R_{infobits} = FI(\{\gamma_j\})/T_{codingblock}, \quad (11)$$

where $R_{infobits}$ is the transmission rate of the information bits, and $T_{codingblock}$ is the period of one coding block.

Mutual-information based quality indicators like RBI, RBIR, FI and BSR represent the quality of service and can be used to express transmission requirements/constraints, for example $FI_{target}$ or $RBI_{target}$. By comparing the target with the corresponding measured values, e.g. $FI_{measurement}$ or $RBI_{measurement}$, it can be determined whether the requirement is satisfied. The indicators based on mutual information are independent of channel pattern and variation, which makes them easier to use than conventional QoS parameters when it comes to resource allocation.

It should be noted that other mutual-information based quality indicators, such as other types of normalized FI and RBI parameters, for instance, also lie within the scope of the present invention.

Modulation Model by Mutual Information

The modulation model (12 in FIG. 1) deals with the symbol-level mutual information SI for different modulation constellations.

According to Shannon information theory [5], the channel capacity for an AWGN channel without bandwidth limit is:

$$C = \log_2(1 + E_S/N_0) \text{ [bits/symbol]} \quad (12)$$

For digital modulation the mutual information SI denotes the capacity of a discrete-input and continuous-output channel. The capacity of an M-order constellation cannot be higher than $\log_2 M$, but it can be quite close to Shannon channel capacity at very low SIR values in case of a perfect knowledge of $\gamma_j$. In addition, given a channel state $\gamma_j$, SI is larger for a higher-order modulation in case of a perfect knowledge of the channel. However, it can be expected in case of imperfect channel estimation that the information content will be limited by the estimation of $\gamma_j$.

Coding Model by Mutual Information

As shown in FIG. 1, the coding model 13 for a multi-state channel includes functionality for symbol information combining 14 and quality mapping 15.

The quality model 100 for a multi-state channel can for instance be implemented through look-up tables of mutual information and include the following steps:

[1] For a set of soft outputs of the demodulator with the multiple channel states $\{\gamma_1, \gamma_2, \ldots, \gamma_J\}$, $\{SI_1, SI_2, \ldots, SI_J\}$ are calculated by checking the look-up table of mutual information for a certain constellation, as described by the above modulation model 12.

[2] Select the look-up tables for a codec. The tables are generated based ore AWGN simulation results, which should not depend on modulation mode. For example, the look-up tables of RBI to FI and RBIR to BLER can be selected.

[3] Collect RBI or RBIR by (7) or (8). This functionality is in FIG. 1 performed at unit 14. To simulate the codec behavior in case of non-optimal decoding algorithm, a modification is needed in (7) by introducing a correctness for RBI, in the form of a RBI adjusting factor $RBI_{cod}$, as follows:

$$RB * I(\{\gamma_j, j = 1 \approx J\}) = RBI_{cod} \sum_{j=1}^{J} I(\gamma_j) \quad (13)$$

Another correctness method for RBI is expressed by:

$$RBI(\{\gamma_j, j = 1 \approx J\}) = \sum_{j=1}^{J} I(\gamma_j \mid \gamma_{cod}), \quad (14)$$

where $\gamma_{cod}$ is the SIR-domain adjustment factor.

[4] Get the quality indicators by checking the AWGN look-up tables. This functionality is in FIG. 1 represented by unit 15.

The introduction of a block-level mutual-information based parameter like RBI (or RBIR) in the L2S interface enables having separate modulation and coding models, respectively, and the interface between the modulation model 12 and the coding model 13 is linear. The linear interface feature makes it comparatively straightforward to access the estimations of different quality indicators based on the link information measurements.

The above-described quality model proposed in accordance with the present invention is associated with the advantage of being more accurate than corresponding L2S interfaces in the prior art.

A New Resource Allocation Procedure

In accordance with the present invention, it is suggested to use rich feedback of the above-described kind, which carries the channel condition information and the transmission information requirement, to achieve an improved resource allocation procedure. The resource allocation preferably comprises power allocation (power control) and/or link adaptation. Basically, MI-based quality indicators of a previous (current) transmission, the channel prediction of a subsequent transmission ("the next try" in case the invention is used for retransmission improvements) and generally also one or more quality requirements, are used to determine how much resources, including time, frequency and power resources, that should be used for the subsequent transmission ("the second try").

Thus, the present invention introduces new quality measures in the resource allocation, whereas resource allocation in the prior art is based on conventional measurements, e.g. SIR or BLER. As will be evident in the following, the new MI-based indicators are associated with some advantageous features, enabling a more reliable and efficient packet transmission over communication links.

For the purpose of this disclosure resource allocation refers to allocation/distribution/setting/control of resources such as transmit power or link-defining resources (e.g. related to frequency or time) to a communication link. Allocation of link-defining or link-related resources for example includes adaptive selection of modulation-mode, coding rate, and/or source data rate based on the channel conditions. It also includes channel allocation in the frequency domain, time domain, spatial domain and/or code domain. Allocation of link-defining resources will hereafter generally be referred to as link adaptation.

Figure 2:
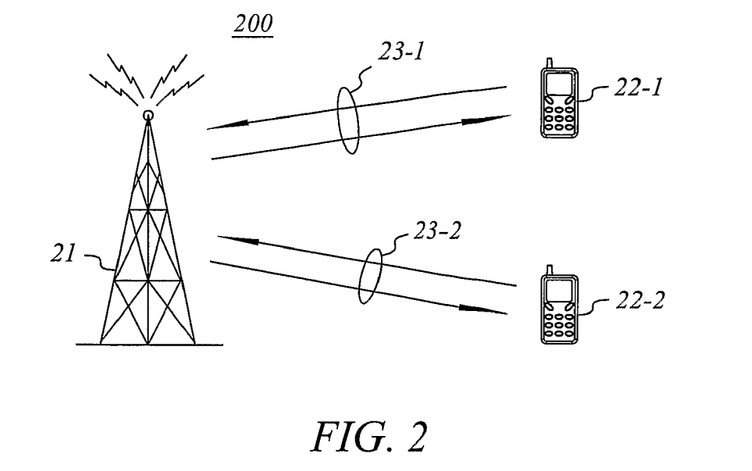
FIG. 2 illustrates (part of) a communication system in which the present invention may be used.

FIG. 2 illustrates a communication (sub)system 200 in which the present invention can be used. A base station 21 communicating with mobile nodes 22 (user equipment, mobile stations, etc) over respective communication links 23 is illustrated. The invention is particularly advantageous for (although not limited to) packet-based communication over wireless links and addresses situations where a transmitting unit transmits or tries to transmit a signal to a receiving unit over a communication link. The receiving unit monitors the link and based on measured link information, it is determined how to allocate resources to the link. Generally, all participating units 21, 22 are transceivers, comprising both receiving and transmitting functionality. For the purpose of the invention the "receiving" or "transmitting" unit may be a base station 21, a mobile node 22, or any other suitable communication node/unit.

Figure 3:
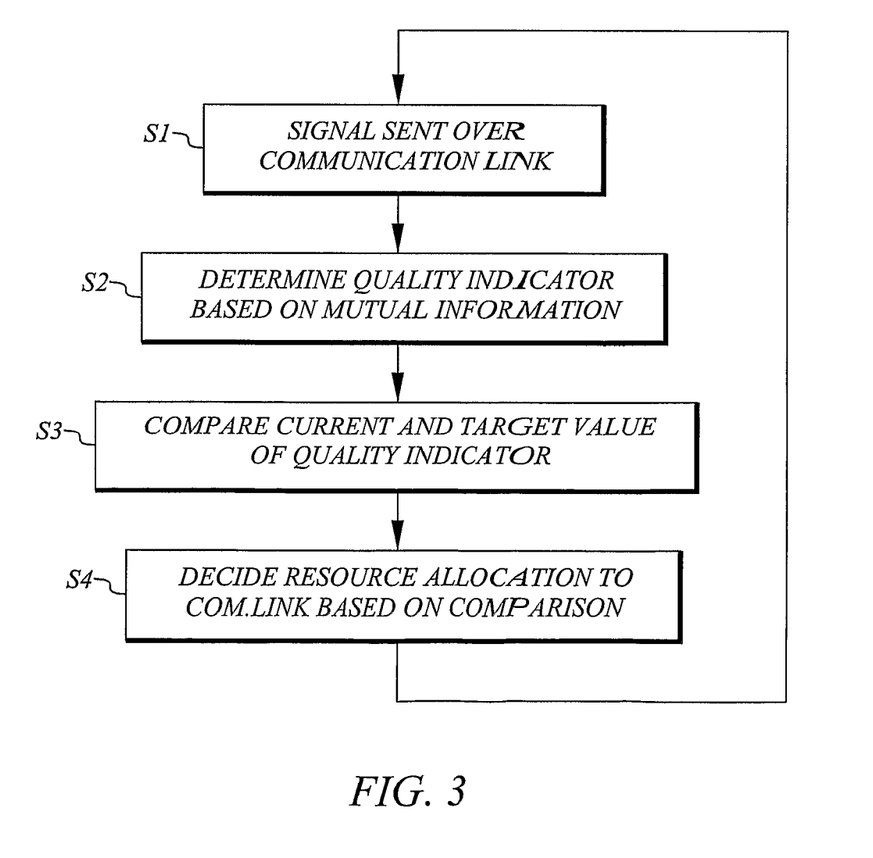
FIG. 3 is a flow chart of a method for resource allocation according to an example embodiment of the present invention.

FIG. 3 is a flow chart of a method for allocating resources in accordance with an example embodiment of the present invention. In a first step S1, a signal is sent from a transmitting unit to a receiving unit over a communication link. A current value of a quality indicator/link measure (e.g. FI, RBI) for the signal is determined based on a mutual information relationship/formula (step S2). For this, an information-based quality model can be used which simplifies the modulation mode selection and coding rate adaptation, by allowing modulation mode selection and coding rate adaptation to be performed separately. The quality indicator is a parameter (directly or indirectly) representative of the block-level mutual information of the signal. It can for example represent the total coded bit information of a received block, such as RBI or RBIR, or represent the total decoded bit information of a received block, such as FI or BSR. Link information (e.g. SIR) of the signal measured at the receiving unit is preferably used as input in the step of determining the quality indicator.

The step of determining the quality indicator preferably comprises modeling mutual information parameters at symbol-level using a modulation model with a representation of the signal-to-interference ratio as input, and combining the mutual information parameters into block-level mutual information. This coded block-level mutual information can be transformed into an decoded quality indicator at block-level using a coding model independent of said modulation model. For example, step S2 can involve mapping of received modulation symbol signal-to interference (SIR) to symbol information (SI); mapping of the SI value to received block information (RBI); and mapping the RBI value to block error rate (BLER) and/or frame information (FI).

Still referring to FIG. 3, it is decided how resources are to be allocated to the communication link in response to the current value of the quality indicator in step S4. The quality indicator is typically input to a resource allocation function, and resources are then distributed based on the output of the function. Normally, the resource allocation involves or is preceded by a comparison between the current value of the quality indicator and a target value thereof (step S3).

The resource allocation can thus be performed through a resource allocation parameter, such as power or coding rate. Performing the actual resource allocation normally involves setting one or more of the following parameters at the transmitting unit:
i) transmission bandwidth and its spectral location
ii) timing of transmission
iii) transmit power
iv) formats of a packet or subpacket in a hybrid automatic repeat request (H-ARQ) session
v) number of retransmissions in a H-ARQ session When the resource allocation is used to determine the transmission bandwidth and its spectral location (i), it for example comprises setting the location and the number of transmitted subcarriers in a multi-carrier system, and/or the number of code channels in a code division multiplexed system. When the resource allocation is used to determine the timing of transmission (it), it can for example comprise setting the time instant of transmitting a packet or a subpacket in an H-ARQ session, and the duration of a transmitted packet or subpackets in an H-ARQ session. When the resource allocation is used to determine formats of a packet or multiple subpackets in a H-ARQ session (iv), it for example comprises selecting one or more of the following parameters: the modulation order, the forward error correction (FEC) rate, the type of FEC code, and the type of H-ARQ combining.

By means of the invention it is often possible to use a single look-up table for a certain coding scheme, which is independent of the modulation mode. This leads to straightforward implementations of the resource allocation functionality.

It should be mentioned that the resource allocation decision sometimes may imply that transmission is not to take place, i.e. that no resources are to be allocated to the link. This is typically regulated through the transmission timing; if the current channel condition or the near future is so bad that (re)transmission is deemed useless, the transmission can be suspended and resumed later.

As for the QoS criteria, normally at least one QoS criterion directly related to the quality indicator criteria (e.g. $RBI_{target}$ or $FI_{target}$) should be included when determining the resource distribution. This is typically the case with the block error rate or a per link throughput criterion. However, there may also be optional criteria, such as BLER, packet transmission delay, delay jitter or residue block error rate (BER), which can be used to determine the service priority of individual users. In either case, when at least one QoS criterion uses a quality indicator like RBI or FI, the invention improves the accuracy of the resource allocation function.

The present invention results in a number of advantages. It can increase the transmission reliability by allocating resources based on channel conditions and quality requirements. Moreover, in case of a transmission failure, the proposed resource allocation will increase the probability of a successful retransmission. This means that there will not be as many retransmissions as with the conventional technology, i.e. the transmission delay caused by incorrect retransmission is reduced.

Furthermore, by means of the invention, the transmission efficiency can be increased. Mutual-information based link-adaptation and power control enables allocation of appropriate resources for retransmission and hence the resource waste can be reduced. The resource is allocated just above enough to support the quality requirement. Even though a margin of resource allocation is needed to ensure robustness against the channel variation and estimation errors, the resource waste will be less than for example in the traditional ARQ/HARQ that supports the same transmission quality and delay.

In particular, by introducing power control and/or link-adaptation based on rich feedback, an improvement of transmission/retransmission mechanisms like ARQ/HARQ can be achieved. For example, by means of the proposed link-adaptation a flexible coding rate-selection, i.e. variable retransmission block-sizes, can be provided and hence the transmission efficiency will be increased compared to e.g. the current HARQ/AMC in HSDSCH. (Conventional ARQ/HARQ with ACK/NACK feedback can only provide a certain type of coding rates. Consequently, waste of some resource cannot be avoided sometimes, even with AMC scheduling.)

There may be embodiments of the invention in which the resource allocation involves either power allocation or link adaptation. However, the invention also enables implementation of a particular preferred embodiment with cooperative power allocation and link adaptation. By means of the information-based quality model described above, link-adaptation and power allocation can be performed based on the same measurement (i.e. the mutual-information based quality indicator) simultaneously to reach the QoS requirement more exactly. Such cooperative power allocation and link adaptation is combined-designed by considering the total system resource. More flexible power allocation will then typically be used in case of limited channel resources, and more flexible link adaptation will be used in case of a strict limitation of the transmit power or interference level. Such 'cooperation' has been shown to outperform the traditional independent power allocation and link adaptation.

It should be noted that, although there are systems that perform both link-adaptation and power allocation in the prior-art, in these systems the link-adaptation and power allocation are designed independently and are not cooperative. For instance, WCDMA AMR has a slot-wise inner-loop power control based on slot-level SIR estimate, a TTI (transmit time interval)-wise outer-loop power control based on BLER, and a TTI-wise link-adaptation based on TTI-level SIR estimate. Another example is HSDPA, which uses quick TTI-wise link-adaptation according to channel condition and QoS requirement, together with a quite slow power control, which is not targeting any QoS requirements.

The new measurements and procedures are thus very useful in connection with link-adaptation and power allocation for a given user. As mentioned, they are also useful for channel allocation or scheduling where channel resources are distributed among different users. In other words, for the purpose of this disclosure, "communication link" can refer both to a sublink in a set of sublinks forming a link/channel to a particular user and to the respective links/channels associated with respective users. In the frequency domain, channel allocation refers to allocation of carriers (FDMA) or sub-carriers (OFDM|OFDMA). In the time domain, it refers to allocation of time slots (TDMA). Similarly, in the spatial domain channel allocation refers to allocation of antenna links (e.g. MIMO), whereas in the code domain it refers to allocation of spreading codes (CDMA).

As mentioned in the background section, conventional HARQ/AMC solutions typically use the required average SIR as the metric in the task of counteracting the uncertainty of wireless channel variation. The traditional method relies on the average SIR-BLER relationship. If the current transmission does not reach the desired BLER, the strategy is to retransmit at a power level or with a different modulation or coding format such that the total received SIR will be sufficient for the desired BLER. However, the average SIR-BLER characterization depends on the rate and pattern of channel variation. Different rates and patterns of channel variation result in different average SIR-BLER curves, even with the same modulation and coding. HARQ/AMC requires exhaustive simulation of all possible channel variations, which is a formidable task. The invention overcomes these difficulties by introducing an information measure characterization (MI-based quality indicators) that translates the varying SIR values to a unified quantity that is independent of the rate and pattern of channel variation.

Figure 4A:
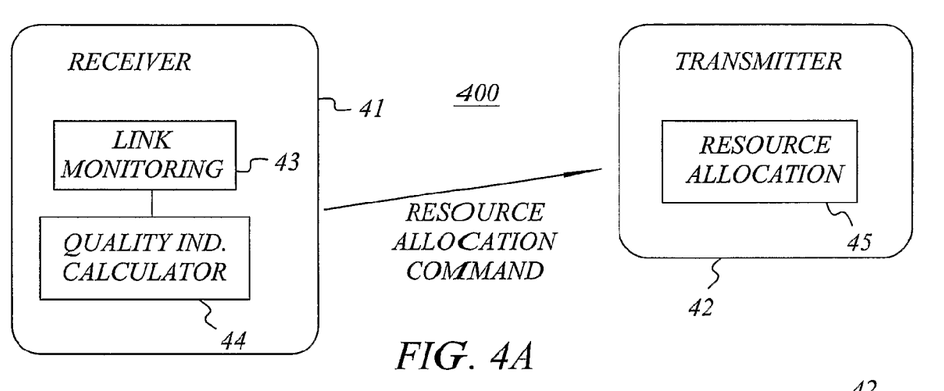
FIG. 4A-C are schematic block diagrams illustrating various arrangements of the quality indicator determining functionality in communication units according to example embodiments of the present invention.
Figure 4B:
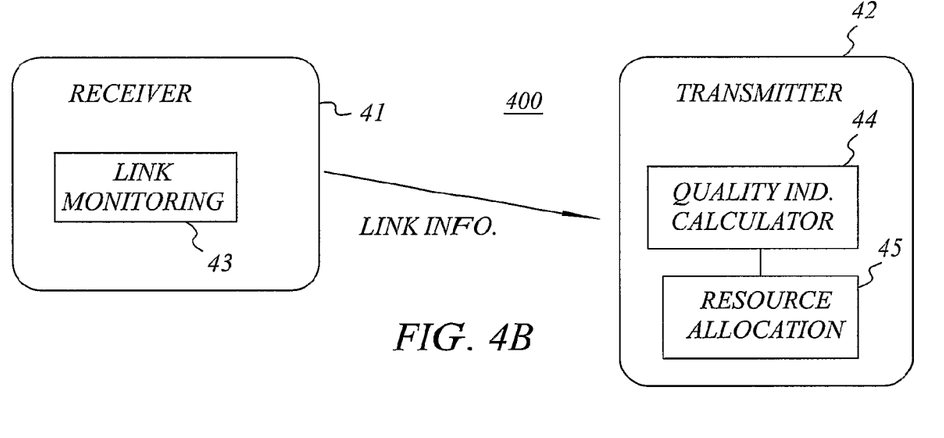
Figure 4C:
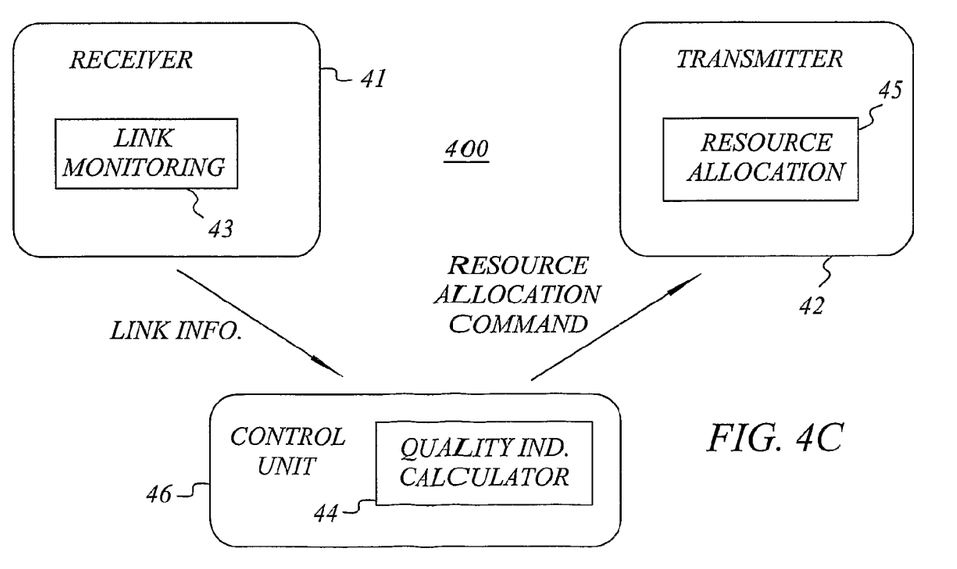

FIG. 4A-C are schematic block diagrams illustrating various arrangements of the quality indicator determining functionality in communication units according to example embodiments of the present invention. All three illustrated resource allocation mechanisms 400 present a receiving unit 41 with link monitoring functionality 43 and a transmitting unit 42 with functionality 45 for performing the actual resource allocation.

In a first embodiment (FIG. 4A), the quality indicator is calculated at the quality indicator calculator 44 of the receiving unit 41. The receiver 41 also comprises means (not shown) for deciding what resources that are to be allocated to the link in question. A resource allocation control command is sent from the receiving unit 41 to the transmitting unit 42 and the transmitting unit allocates resources in accordance with this command.

In a second embodiment (FIG. 4B), the quality indicator calculator 44 is instead located at the transmitter side. The receiver 41 simply transmits link information for calculation of the quality indicator to the transmitter 42, whereupon the quality indicator is calculated at the transmitter, which determines and executes the resource allocation.

As illustrated in FIG. 4C, there may also be embodiments where the quality indicator(s) are calculated at a location that is neither the actual receiver unit nor the transmitter unit, for example at a separate higher-level control unit 46. In this case, link information for calculation of the quality indicator is sent from the receiver 41 to the external control unit 46. The control unit 46 computes the quality indicator and transmits a resource allocation control command to the transmitter 42. As in FIG. 4A, the resource allocation functionality 45 of the transmitter 42 then performs the resource allocation according to the control command.

To avoid confusion, the units 41 and 42 are in FIG. 4 denoted as receiver and transmitter. Of course, the normal situation would be that each unit comprises both receiving and transmitting functionality, i.e. is a transceiver unit.

Quality Indicator Determining—Example Implementations

As mentioned, the invention has some advantageous applications in connection with ARQ/HARQ retransmissions.

In HARQ, the source rate is fixed, i.e. constant K and as mentioned in the background section, the procedure of soft combining depends on which HARQ combining scheme that is used. In HARQ-CC, the receiver always combines the full retransmission of the failed block; i.e. the amount of data in the receiver buffer remains the same. In HARQ-IR, the receiver buffers coded symbols, which introduce new information to the block transmitted first; i.e. the amount of data to be buffered increases with consecutive retransmissions.

Consequently, there are three types of ARQ/HARQ schemes: the traditional ARQ (type I); HARQ—Chase combining (type II); and HARQ—Incremental Redundancy (type III). The resource allocation in the different types can be explained through the different factors that are adjusted/determined:

For type I & II, i.e. traditional ARQ and HARQ-CC, since the coding rate is fixed, the $BLER_{target}$ or $FI_{target}$ can be translated to $RBI_{target}$. Therefore, the retransmission adaptation will be to minimize the power cost by adjusting power to reach $RBI_{target}$, i.e. power allocation. Typically, the aim is to determine the power required to achieve the received SIR that corresponds most closely to the $RBI_{target}$ using HARQ-CC.

For type III, i.e. HARQ-IR, the issue will typically be to minimize the occupied channel resource and reach $FI_{target}$, i.e. coding rate adaptation. The coding rate varies according to the re-transmission times and strategies. After each retransmission, the HARQ-IR system will correspond to a certain code scheme, the $RBI_{target}$ of which can be easily obtained from $FI_{target}$. It is also possible to combine the coding rate adaptation with power allocation. Hereby, the aim can be to determine the code rate required to achieve the received RBI that is closest to the $RBI_{target}$ using HARQ-IR.

In addition, for all the cases modulation adaptation might be performed based on the instantaneous channel quality. The modulation adaptation would normally be optional in the sense that manufactures can select not to do modulation adaptation.

For a coding block with K information bits Equation (15) provides the frame information (FI) of the $i^{th}$ transmission as:

$$FI_i = (1 - BLER_i) * K \quad (15)$$

According to the BLER target (or other QoS requirements) the FI requirement is derived as:

$$FI_{target} = (1 - BLER_{target}) * K \quad (16)$$

For a certain coding mode, there is an exclusive mapping between FI and the coded (received) block information RBI. The RBI for the $i^{th}$ received block is denoted $RBI_i$. Accordingly, RBI targets for different coding modes can be obtained.

Based on the information measurements of the failed i-times receptions, the difference to the information target of successful reception can be calculated and fed back to the transmitter as the information requirement of the next retransmission. For ARQ, the information requirement for the for the $i+1^{th}$ try of retransmission is:

$$\Delta FI_{ARQ,i+1} = FI_{target} \quad (17)$$

For HARQ, it is expressed as the information difference:

$$\Delta FI_{HARQ,i+1} = FI_{target} - \sum_{l=1}^{i} FI_l \quad (18)$$

Or in RBI domain:

$$\Delta RBI_{HARQ,i+1} = RBI_{target} - \sum_{l=1}^{i} RBI_l \quad (19)$$

$\Delta$RBI can be further mapped to $\Delta$SIR for a given modulation mode.

Generally, the FI expressions are used for coding mode selection, whereas RBI expressions are used for modulation mode selection and power control.

The following paragraphs give examples on power control, modulation mode selection and coding rate selection for the ARQ/HARQ schemes.

Power Control & Modulation Mode Selection with Given Coding Mode

Given coding mode, the FI requirement $\Delta$FI can be calculated. For both ARQ and HARQ-IR, the RBI requirement for the next try of retransmission is calculated by:

$$\Delta RBI_{ARQ/HARQ-IR,i+1} = FI2RBI_{cod,i+1}(FI_{target}) - \sum_{l=1}^{i} FI2RBI_{cod,i+1}(FI_l) \quad (20)$$

with the corresponding SIR requirement:

$$\Delta SIR_{ARQ/HARQ-IR,i+1} = SI2SIR_{mod,i+1}\left(\frac{\Delta RBI_{ARQ/HARQ-IR,i+1}}{\Delta N_{i+1}}\right) \quad (21)$$

where $\Delta N_{i+1}$ is the number of coded bits within the coding block for the coming $(i+1)^{th}$ retransmission, which equals to N for ARQ and HARQ-CC. The transmitted power of the $(i+1)^{th}$ retransmission shall be decided by both $\Delta SIR_{i+1}$ and the channel prediction.

For HARQ-CC with maximum ratio combining (MRC), the SIR requirement for the next try of retransmission is:

$$\Delta SIR_{HARQ-CC,MRC,i+1} = SI2SIR_{mod,i+1}\left(\frac{RBI_{target}}{\Delta N_{i+1}}\right) - SI2SIR_{mod,i+1}\left(\frac{\sum_{l=1}^{i} RBI_l}{\Delta N_{i+1}}\right) \quad (22)$$

with the corresponding RBI requirement:

$$\Delta RBI_{HARQ-CC,MRC,i+1} = N_{i+1} \cdot SIR2SI_{mod,i+1}(\Delta SIR_{HARQ-CC,MRC,i+1}) \quad (23)$$

The SIR requirement is the effective SIR target for power control in the next try of retransmission, i.e. power shall be allocated to reach $\Delta$RBI with a given modulation mode.

Figure 5:
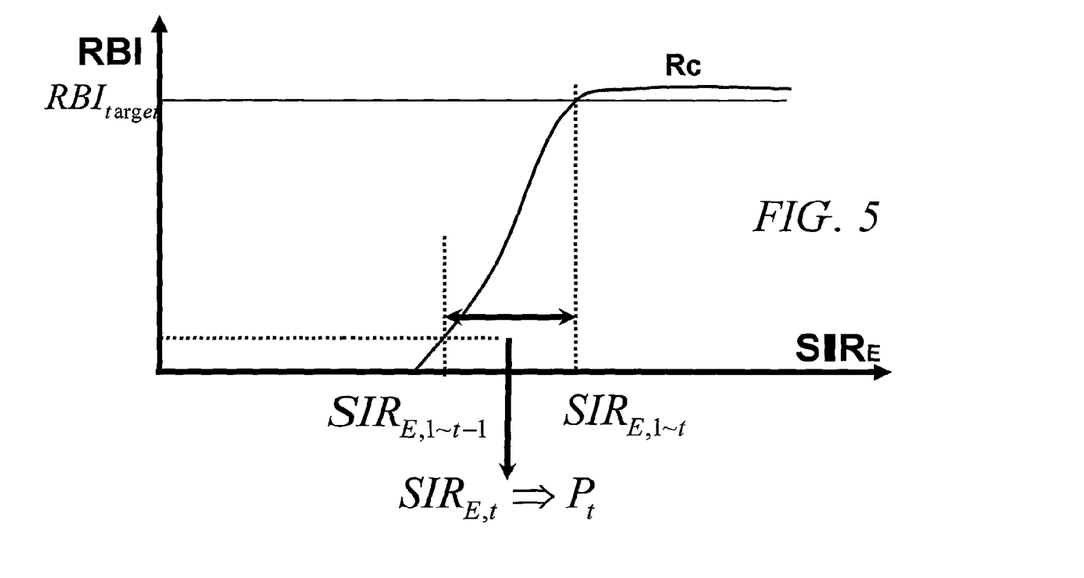
FIG. 5 is a diagram illustrating the RBI vs. SIR mapping for a HARQ-CC system according to an example embodiment of the present invention.

FIG. 5 contains a diagram exemplifying the power allocation for an HARQ-CC system. An RBI vs. SIR mapping function is shown. $SIR_{E,1\sim t-1}$ is the effective combined SIR of the previous $1\sim(t-1)$ transmissions, and $SIR_{E,1\sim t}$ is the desired effective combined SIR of all the t transmissions. $SIR_{E,t}$ is the SIR target of the t-th transmission, based on which the allocated power is decided. $RBI_{target}$ gives the requirement of the final combined $SIR_{target}$. The combined SIR can be obtained based on the measurements of all the received transmissions. The differences between $SIR_{target}$ and the measurements, together with the channel quality prediction, give the power requirement.

As for the modulation mode, for a given effective SIR target, which could be limited by the maximum power threshold, it should be selected to satisfy the $\Delta$RBI requirement for the coming (retransmitted) block.

The present invention offers the possibility of modulation-adaptation within a coding block to maximize the channel capacity. This constitutes still another advantage thereof. By introducing the MI-based quality model, multiple modulation modes can be used within a coding block, and with a properly designed algorithm the mixed-modulation scheme may be better than the single-modulation scheme.

Coding Rate Selection

Coding rate selection is primarily used with HARQ-IR.

In case of limited transmission power and given modulation scheme, the coding rate for the next try of retransmission shall be determined to satisfy the $\Delta$FI requirement.

Let $R_{pathloss}$ denote the channel path loss ratio of the $i+1^{th}$ transmission channel prediction over that of the $i^{th}$ failed try, then:

$$SIR_{i+1} = SIR_i \frac{P_{i+1}}{P_i \cdot R_{passloss}} \quad (24)$$

where $P_i$ and $P_{i+1}$ are the transmitted power for the $i^{th}$ retransmission and the $i+1^{th}$ retransmission respectively, and $SIR_i$ and $SIR_{i+1}$ are the corresponding received effective SIR values. Accordingly, the averaged symbol information (SI) can be calculated by:

$$SI_{i+1} = SIR2SI_{mod,i+1}(SIR_{i+1}) \quad (25)$$

After the $(i+1)^{th}$ retransmission try in HARQ-IR, the coding rate will change from $(N_i,K)$ to $(N_{i+1},K)$, i.e. the $(i+1)^{th}$ try will transmit $\Delta N = N_{i+1} - N_i$ coded bits. The mapping function $FI2RBI_{cod,i+1}()$ for the $(i+1)^{th}$ try is determined by the coding rate. The coding rate should be selected to satisfy:

$$\Delta N \cdot SI_{i+1} = FI2RBI_{cod,i+1}(\Delta FI) \quad (26)$$

Figure 6:
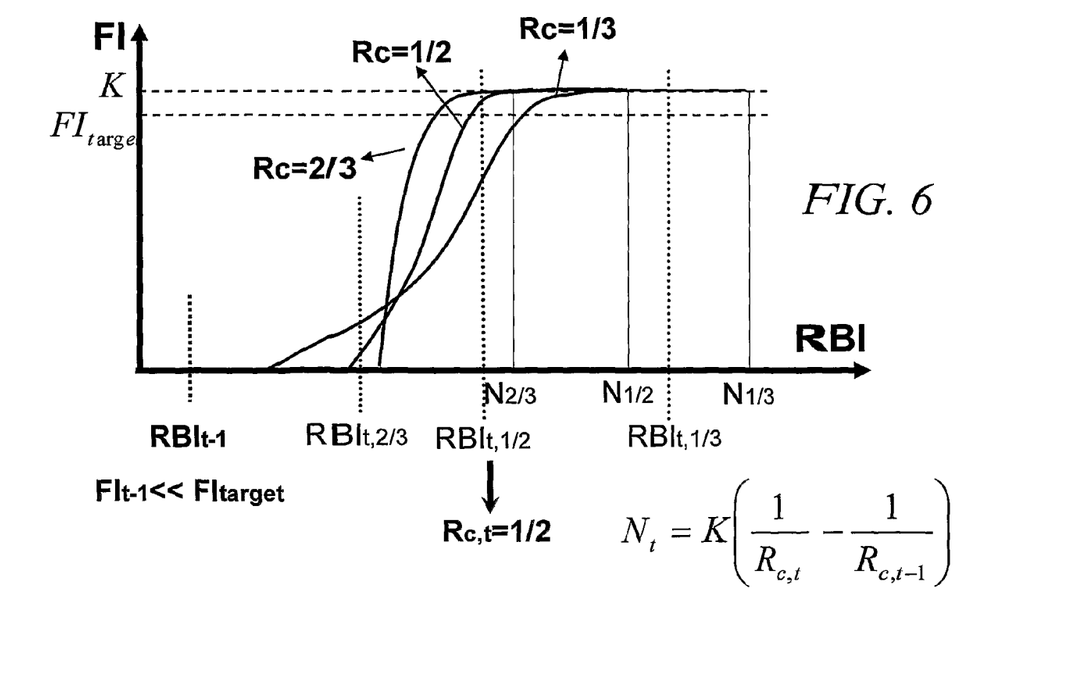
FIG. 6 is a diagram illustrating mapping functions between FI and RBI for a HARQ-IR system according to an example embodiment of the present invention.

FIG. 6 contains a diagram illustrating the coding rate selection for an HARQ-IR system. A number of mapping functions between FI and RBI for different coding rates A are shown. The information requirement (RBI requirement) of the next transmission for each coding rate can be calculated from $FI_{target}$ and the measured received RBI. Based on channel prediction and corresponding power allocation, the RBI of the next transmission can be predicted The highest coding rate that satisfies the $FI_{target}$ will be selected. In the illustrated example, this means that A½ will be selected. N is then decided by the final rate of the t and (t–1) transmissions. Alternatively, for a selected coding rate, the power can be determined by the RBI requirement and channel quality.

Figure 7:
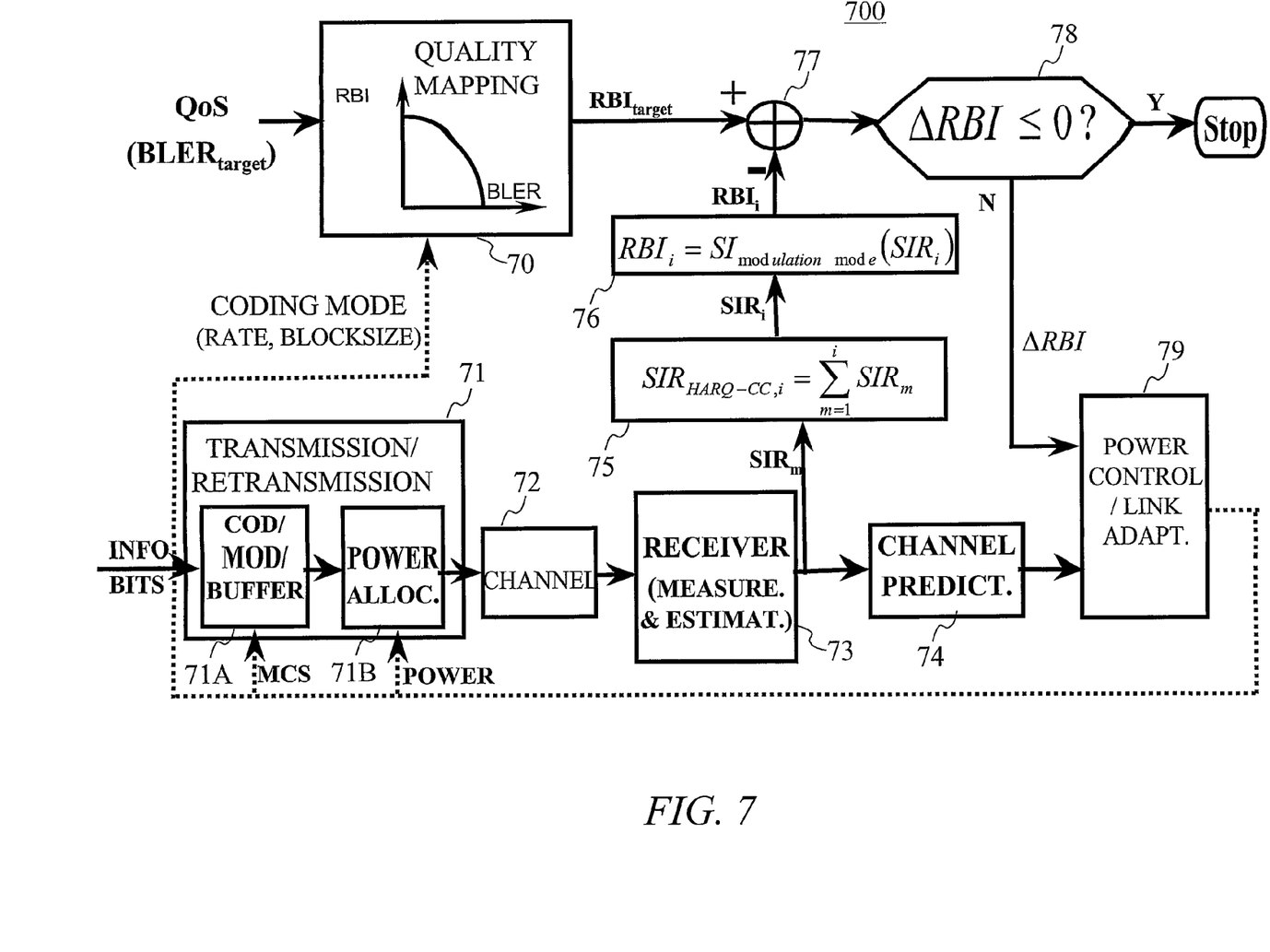
FIG. 7 is a schematic block diagram of a system for resource allocation with HARQ-CC according to an example embodiment of the present invention.

FIG. 7 is a schematic block diagram of a system for resource allocation with HARQ-CC according to an example embodiment of the present invention.

The example illustrates a system/mechanism 700 for combined power allocation and link adaptation comprising a quality mapping unit 70; a (re)transmission unit 71; a channel 72; a receiver 73, a unit for channel prediction 74; units 75, 76 for SIR combination and RBI calculation; a unit 77 for RBI comparison; a resource allocation decision unit 78; and a unit 79 for power control (allocation) and link adaptation.

The quality mapping unit 70 is provided with or has access to a number of coding performance lookup tables (e.g. RBI-BLER or RBIR-BLER for a number of coding modes). The inputs to the quality mapping unit 70 include at least one quality requirement, such as $BLER_{target}$ and information about the coding mode, e.g. coding rate and block size. By means of these inputs the quality mapping unit can check out the information requirement/quality indicator for each coding block. In FIG. 7, the target value of the quality indicator RBI, $RBI_{target}$, is output from the quality mapping unit 70.

Turning to the line containing transceiver functionality and where the channel measurements take place, an information bit sequence is input to a transmitter unit 71. The transmitter unit 71 normally has means for first transmission as well as for retransmissions and includes a code/modulation/buffer subunit 71A and a power allocation subunit 71B. The cod/mod/buffer unit 71A receives inputs comprising the information bit sequence and MCS signals (modulation mode, coding rate, etc.) and outputs a modulated symbol sequence. The modulated symbol sequence is forwarded to the power allocation unit 71B, to which the current transmitted power is also provided. The unit 71B provides the transmitted symbol sequence with the allocated power level.

The transmitted base-band symbol sequence is passing a channel before entering a receiver unit 73 at the receiving side. For a real system, the channel unit 72 of FIG. 7 represents the radio transmission in the air, while for simulation purposes it can be a channel model introduced to model some typical wireless propagation channels.

In the receiver unit 73, the base-band received symbol sequence are subject to measurement and estimation functions, which are used to carry out the link-adaptation and power control. The outputs from the receiver unit 73 include channel impulse response estimations that are transferred to a channel prediction unit 74 and SIR-related information, such as SIR estimates for each transmission unit (e.g. time slot) or the SIR distribution, normally transferred to the channel prediction unit 74 as well as to a SIR combination unit 75. The channel prediction unit 74 predicts the SIR distributions of the coming transmissions from the SIR estimates/distribution (for each transmission unit) of the previous (several) TTIs and the channel impulse response estimation of the previous TTIs.

Turning to the SIR combination unit 75, maximum-ratio-combination (MRC) is assumed and inputs comprising the SIR estimates for each transmission unit of the previous (several) TTIs are combined into the effective SIR $(SIR_i)$ after MRC combination. In the subsequent RBI calculation unit 76, the equivalent RBI for the total i transmission tries is calculated based on the equivalent SIR of the total 1st~ith time transmission and the modulation mode.

The system 700 further comprises functionality for comparing the target value of the quality indicator (RBI) with the measured/estimated value thereof. This functionality is in FIG. 7 represented by a RBI comparison unit 77 that basically performs the calculation: $\Delta RBI = RBI_{target} - RBI_i$. The result of the comparison is turned into a ΔRBI-decision in the ΔRBI decision unit 78. In the example, if $\Delta RBI \leq 0$ the resource allocation will not be further increased but, on the other hand, if ΔRBI>0 the RBI requirement of the next transmission (e.g. expressed through ΔRBI) is transferred to the power control/link adaptation unit 79. This unit 79 for resource allocation is thus provided with the RBI requirement of the next transmission and with the SIR statistics prediction of the next transmission. Based on these inputs, it can perform MCS selection and power allocation such that the transmission conditions are improved.

Normally, resource allocation like the described mechanism is an iterative process, where the outputs of the power allocation/link adaptation unit 79 are transferred back to the quality mapping unit 70 and the transmitter unit, respectively, and continuous measurements are performed on the received symbol sequence in order to improve the resource distribution and transmission settings.

Figure 8:
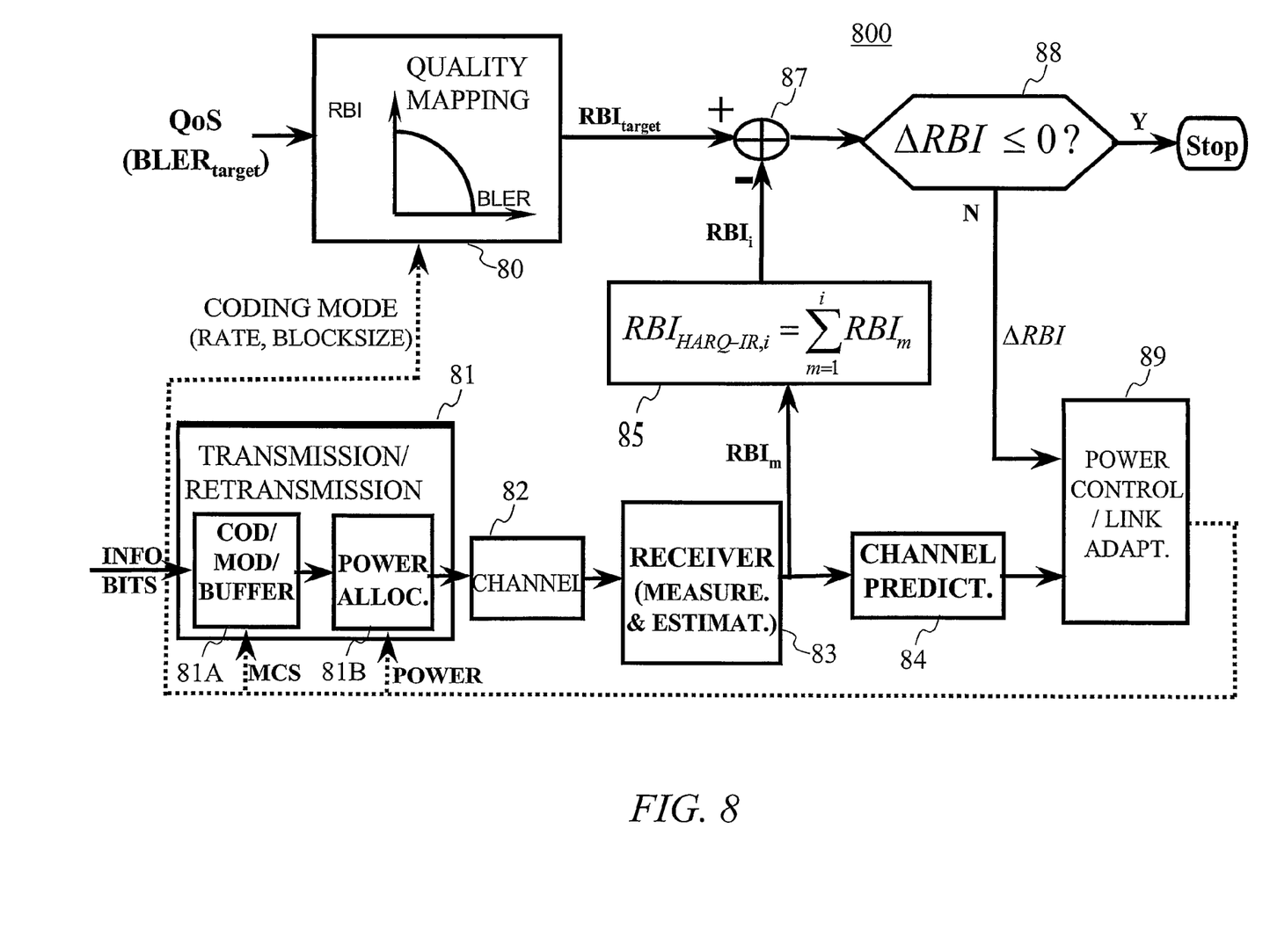
FIG. 8 is a schematic block diagram of a system for resource allocation with HARQ-IR according to an example embodiment of the present invention.

FIG. 8 is a schematic block diagram of a system for resource allocation with HARQ-IR according to are example embodiment of the present invention. The example illustrates a system/mechanism 800 for combined power allocation and link adaptation comprising a quality mapping unit 80; a (re)transmission unit 81; a channel 82; a receiver 83, a unit for channel prediction 84; a units 85 for RBI calculation; a unit 87 for RBI comparison; a ΔRBI decision unit 88; and a unit 89 for power control (allocation) and link adaptation.

Most of the functionality of FIG. 8 corresponds more or less directly to the functionality described above with reference to FIG. 7. However, while FIG. 7 is for HARQ-CC, FIG. 8 illustrates HARQ-IR. This means that in FIG. 7, the coding rate is fixed for all the retransmission times, i.e. the quality map (RBI-BLER) is fixed for HARQ-CC. Therefore, the $RBI_{target}$ need to be checked out only once. However, in FIG. 8, the coding rate decreases with more retransmission tries due to the increasing redundancy bits. Therefore, the RBI-BLER map varies according to the re-transmission times and the strategies. Consequently, $RBI_{target}$ needs to be checked for each retransmission try.

Moreover, the output of the receiver units 73; 83 are different. In the HARQ-CC case, SIR estimation and the channel estimation are required. HARQ-IR uses one further estimation—the quality indicator (RBI) estimation.

As for the MCS selection in the transmitter unit 71; 81, with HARQ-CC only a certain MCS is used in all the retransmission tries, therefore the encoding and modulation are only implemented once for a certain information block, and the buffered modulated symbol sequence will allocated to different power levels, i.e. controlled by power allocation in the retransmissions. With HARQ-IR, on the other hand, both cod-rate & modulation-mode selection will be implemented at any retransmission tries, as well as the power allocation.

With modifications obvious to the person skilled in the art, the schemes illustrated by FIGS. 7 and 8 may be used for example to perform separate power allocation or separate link adaptation. RBI can be replaced by another quality indicator based on mutual information, such as the block-level parameters described above. Furthermore, it should be understood that the blocks of FIGS. 7 and 8 represent functionality that preferably are present in a resource allocation system according to the invention. Different embodiments may have the functionalities differently implemented and two or more of the blocks may very well be implemented together at the same physical unit.

Considering the coding rate limit associated with HARQ-IR, i.e. less combining gain for lower coding rate, the cooperative power allocation would be a good complement in this case. (The problem is serious for Turbo code, because most of the existing system use ⅓ rate Turbo code as the mother code, and use rate-matching to control the final coding rate. It is known that HARQ-IR has quite small gain over HARQ-CC for coding rate lower than 0.5.)

The above models for ARQ/HARQ-CC and HARQ-IR are useful to reduce the retransmission delay.

From the above examples it is evident that the procedure according to the invention is very useful in cases where there has been transmission failure and retransmission is performed. However, it should be emphasized that is equally applicable to provision what resources are required for new packet transmission. For example, for links without H-ARQ (such as the current voice traffic), the rich feedback can be used to adjust the power of the next packet to maintain a desirable performance level. Even when the current packet is received successfully, the rich feedback can tell the system if there are enough resources to maintain the desirable performance level for future packets. In a particular preferred embodiment of the invention, comparisons with target values and adjustments of the allocated resources are performed continuously to increase the transmission reliability and efficiency.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

ABBREVIATIONS

ACK—ACKnowledgement
AMC—Adaptive Modulation and Coding
ARQ—Automatic-Repeat-Request
AWGN—Additive White Gaussian Noise
BLER—Block Error Rate
BPSK—Binary Phase Shift Keying
BSR—Block Successful Rate
EESM—Exponential Effective SIR Mapping
FEC—Forward Error Correction
FI—Frame Information
HARQ—Hybrid Automatic-Repeat-Request
HARQ-IR—HARQ Incremental Redundancy
HARQ-CC—HARQ Chase Combining
HSDPA—High Speed Downlink Packet Access
HSDSCH—High Speed Downlink Shared Channel
MCS—Modulation and Coding Scheme
MRC—Maximum Ratio Combining
NACK—Non-ACKnowledgement
QoS—Quality of Service
QPSK—Quadrature Phase Shift Keying
RBI—Received Block Information
RBIR—Received Block Information Rate
RSI—Received Slot Information
SI—modulated Symbol Information
SIR—Signal to Interference Ratio
TS—Time Slot
TTI—Transmit Time Interval

REFERENCES

[1] Frenger, P., Parkvall, S., Dahlman, E., "Performance comparison of HARQ with Chase combining and incremental redundancy for HSDPA", VTC 2001 Fall. IEEE VTS 54th, Volume: 3, 7-11 Oct. 2001, pp 1829-1833 vol. 3.
[2] Dottling, M., Michel, J., Raaf, B., "Hybrid ARQ and adaptive modulation and coding schemes for high speed downlink packet access", Personal, Indoor and Mobile Radio Communications, 2002. The 13th IEEE International Symposium on, Volume: 3, 15-18 Sep. 2002, pp 1073-1077, vol. 3.
[3] John G. Proakis, "Digital Communications", McGraw-Hill Inc., ver. 3.
[4] John G. Proakis, "Digital Communications", McGraw-Hill Inc., ver. 3, page 380 (Eq. 7-1-15).
[5] R. G. Gallager, Information Theory and Reliable Communication, John Wiley & Sons, 1968.

The invention claimed is:

1. A method for allocating resources to communication links, comprising the steps of:
   determining a current value of a quality indicator for a signal transmitted over a communication link from a transmitting unit to a receiving unit based on a mutual information relationship, comprising the steps of:
      modeling mutual information parameters at a symbol-level using a modulation model with a representation of the signal-to-interference ratio as input; and,
      combining the mutual information parameters into block-level mutual information; and,
   deciding resource allocation for the communication link in response to the current value of the quality indicator.

2. The method of claim 1, wherein the quality indicator represents the mutual information of the signal at block-level.

3. The method of claim 1, wherein link information of the signal measured at the receiving unit is used as input in the step of determining the quality indicator.

4. The method of claim 1, wherein the quality indicator represents total coded bit information of a received block.

5. The method of claim 1, wherein the quality indicator represents total decoded bit information of a received block.

6. The method of claim 1, wherein the step of determining the quality indicator further comprises the step of determining the quality indicator at block-level based on a coding model independent of said modulation model and using the combined block-level mutual information.

7. The method of claim 1, wherein the step of deciding resource allocation in turn comprises:
   comparing the current value of the quality indicator with, a target value of the quality indicator; and
   allocating resources based on the difference between the current value and the target value of the quality indicator.

8. The method of claim 1, wherein the step of deciding resource allocation is further based on at least one quality of service requirement selected from the group of: BLER; packet transmission delay; delay jitter; residue BER and service priority.

9. The method of claim 1, wherein the resource allocation comprises power allocation to the communication link.

10. The method of claim 9, used with HARQ-Chase Combining and comprising power allocation to reach a target value of a representation of the total coded bit information of a received block.

11. The method of claim 1, wherein the resource allocation comprises adaptation of the communication link with regard to at least one link-defining parameter.

12. The method of claim 11, comprising adaptation of a link-defining parameter selected from the group of: coding rate, coding mode, and modulation mode.

13. The method of claim 12, used with HARQ-Incremental Redundancy and comprising coding rate adaptation to reach a target value of a representation of the total decoded bit information of a received block.

14. The method of claim 12, comprising modulation mode adaptation and coding rate adaptation performed separately.

15. The method of claim 11, wherein the link adaptation comprises allocating channels to respective users.

16. The method of claim 1, wherein the resource allocation comprises cooperative link adaptation and power allocation.

17. The method of claim 1, further comprising the steps of:
calculating the quality indicator at the receiving unit; and
sending a resource allocation control command corresponding to the decided resource allocation from the receiving unit to the transmitting unit, whereby resources can be allocated at the transmitting unit in accordance with the control command.

18. The method of claim 1, further comprising the steps of:
receiving, at the transmitting unit, link information from the receiving unit for calculation of the quality indicator;
calculating the quality indicator at the transmitting unit; and
allocating resources at the transmitting unit based on a resource allocation decision by the transmitting unit.

19. The method of claim 1, further comprising the steps of:
receiving, at an external control unit, link information from the receiving unit for calculation of the quality indicator;
calculating the quality indicator at the external control unit; and
sending a resource allocation control command corresponding to the decided resource allocation from the external control unit to the transmitting unit, whereby resources can be allocated at the transmitting unit in accordance with the control command.

20. A communication unit in a system with means for allocating resources to communication links, comprising:
means for determining a current value of a quality indicator for a signal transmitted over a communication link based on a mutual information relationships, wherein the means for determining the quality indicator comprises:
means for modeling mutual information parameters at symbol-level including a modulation model with a representation of the signal-to-interference ratio as input: and,
means for combining the mutual information parameters into block-level mutual information; and,
means for deciding resource allocation for the communication link in response to the current value of the quality indicator.

21. The communication unit of claim 20, wherein the quality indicator represents the mutual information of the signal at block-level.

22. The communication unit of claim 20, wherein measured link information of the signal is used as input in determining the quality indicator.

23. The communication unit of claim 20, wherein the quality indicator represents total coded bit information of a received block.

24. The communication unit of claim 20, wherein the quality indicator represents total decoded bit information of a received block.

25. The communication unit of claim 20, wherein the means for determining at least one quality indicator further comprises means for determining the quality indicator at block-level based on a coding model independent of said modulation model and using the combined block-level mutual information.

26. The communication unit of claim 20, wherein the means for deciding resource allocation in turn comprises:
means for comparing the current value of the quality indicator with a target value of the quality indicator; and
means for allocating resources based on the difference between the current value and the target value of the quality indicator.

27. The communication unit of claim 20, wherein the means for deciding resource allocation uses at least one quality of service requirement selected from the group of: BLER; packet transmission delay; delay jitter; residue BER and service priority.

28. The communication unit of claim 20, wherein the resource allocation comprises power allocation to the communication link.

29. The communication unit of claim 28, used with HARQ-Chase Combining and comprising means for power allocation to reach a target value of a representation of the total coded bit information of a received block.

30. The communication unit of claim 20, wherein the resource allocation comprises adaptation of the communication link with regard to at least one link-defining parameter.

31. The communication unit of claim 30, further comprising adaptation of a link-defining parameter selected from the group of: coding rate, coding mode, and modulation mode.

32. The communication unit of claim 31, adapted for operation with HARQ-Incremental Redundancy and comprising coding rate adaptation to reach a target value of a representation of the total decoded bit information of a received block.

33. The communication unit of claim 31, further comprising means for separate modulation mode adaptation and coding rate adaptation.

34. The communication unit of claim 20, wherein the resource allocation comprises cooperative link adaptation and power allocation.

35. The communication unit of claim 20, further comprising:
means for receiving the signal from a transmitting unit over the communication link; and
means for sending a resource allocation control command corresponding to the decided resource allocation to the transmitting unit, whereby resources can be allocated at the transmitting unit in accordance with the control command.

36. The communication unit claim 20, further comprising:
means from transmitting the signal to a receiving unit over the communication link;
means for determining the current value of the quality indicator using link information from the receiving unit; and means for resource allocation in accordance with the decided resource allocation.

37. The communication unit of claim 20, further comprising:
   means for determining the current value of the quality indicator for the signal transmitted over the communication link from a transmitting unit to a receiving unit using link information from the receiving unit; and,
   means for sending a resource allocation control command corresponding to the decided resource allocation to the transmitting unit, whereby resources can be allocated at the transmitting unit in accordance with the control command.

38. A communication system with means for allocating resources to communication links, comprising a communication unit according to claim 20.

* * * * *

UNITED STATES PATENT AND TRADEMARK OFFICE
CERTIFICATE OF CORRECTION

PATENT NO. : 7,697,948 B2
APPLICATION NO. : 11/577540
DATED : April 13, 2010
INVENTOR(S) : Wan et al.

It is certified that error appears in the above-identified patent and that said Letters Patent is hereby corrected as shown below:

In Column 3, Line 38, in Equation (1), delete "$\gamma_j=(E_{s/N0})_j$," and insert -- $\gamma_j=(E_s/N_0)_j$ --, therefor.

In Column 5, Line 47, delete "$\{\gamma_1, \gamma_2, ..., \gamma_J\}$," and insert -- $\{\gamma_1, \gamma_2, ..., \gamma_J\}$, --, therefor.

In Column 5, Line 53, delete "ore" and insert -- are --, therefor.

In Column 5, Line 65, in Equation (13), delete "RB*I" and insert -- RBI --, therefor.

In Column 7, Line 63, delete "(it)," and insert -- (ii), --, therefor.

In Column 12, Line 51, in Equation (24), delete " $SIR_i \dfrac{P_{i+1}}{P_i \cdot R_{passloss}}$ " and insert -- $SIR_i \dfrac{P_{i+1}}{P_i \cdot R_{pathloss}}$ --, therefor.

In Column 13, Line 3, delete "A" and insert -- Δ --, therefor.

In Column 13, Line 8, delete "predicted" and insert -- predicted. --, therefor.

In Column 14, Line 33, delete "are" and insert -- an --, therefor.

In Column 17, Line 56, in Claim 20, delete "input:" and insert -- input; --, therefor.

Signed and Sealed this

Twentieth Day of July, 2010

David J. Kappos
*Director of the United States Patent and Trademark Office*